(12) United States Patent
Kuwabara et al.

(10) Patent No.: US 6,522,464 B2
(45) Date of Patent: Feb. 18, 2003

(54) DIFFRACTION OPTICAL ELEMENT, OPTICAL SYSTEM AND OPTICAL DEVICE

(75) Inventors: Tetsuo Kuwabara, Urawa (JP); Masaaki Nakabayashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/805,143

(22) Filed: Mar. 14, 2001

(65) Prior Publication Data

US 2002/0015222 A1 Feb. 7, 2002

(30) Foreign Application Priority Data

Mar. 15, 2000 (JP) .......................... 2000-072791

(51) Int. Cl.$^7$ .............................. G02F 1/03
(52) U.S. Cl. ................. 359/361; 359/566; 359/590; 359/576
(58) Field of Search ................ 359/361, 565, 359/576, 590, 566

(56) References Cited

U.S. PATENT DOCUMENTS 5,299,062 A * 3/1994 Ogata ..................... 359/565

FOREIGN PATENT DOCUMENTS

JP    10-239508    9/1998

* cited by examiner

Primary Examiner—Cassandra Spyrou
Assistant Examiner—Fayez Assaf
(74) Attorney, Agent, or Firm—Fitzpatrick, Cella, Harper & Scinto

(57) ABSTRACT

A diffraction optical element comprises a substrate, a diffraction grating formed on the substrate with a material with low ultraviolet resistance and an ultraviolet screening means arranged on the substrate at a position closer to the incident light receiving side of the optical element relative to the diffraction grating. The ultraviolet screening means comprises a dielectric multilayer film and is formed on the other side of the substrate than the side carrying the diffraction grating. Alternatively, the ultraviolet screening means may be provided as a separate member from a diffraction optical element and arranged at a position closer to the incident light receiving side of the diffraction optical element in an optical system.

16 Claims, 6 Drawing Sheets

DIFFRACTION OPTICAL ELEMENT, OPTICAL SYSTEM AND OPTICAL DEVICE

BACKGROUND OF THE INVENTION

1. Field of the Invention

This invention relates to a diffraction optical element, an optical system and an optical device.

2. Related Background Art

Conventionally, the optical systems of semiconductor manufacturing apparatus including projection optical systems are mostly formed by using only refraction optical elements. However, in recent years, a number of optical systems utilizing diffraction optical elements (DOEs) have been proposed. Japanese Patent Application Laid-Open No. 10-239508 describes a diffraction optical element to be used for a lens in an optical system of the type under consideration that provides an improved diffraction efficiency and can be manufactured with ease.

However, the proposals that have been made to date for diffraction optical elements to be used for a lens are mainly intended to improve the diffraction efficiency and the ease of manufacture and do not take the environmental durability into consideration. For instance, a diffraction optical element disclosed in the above Japanese Patent Application Laid-Open No. 10-239508 does not show a level of environmental durability that is high enough to make it pass an environmental durability test such as a weather resistance test where it is exposed to an intense irradiation of ultraviolet rays.

SUMMARY OF THE INVENTION

In view of the above identified technological problem, it is therefore the object of the present invention to provide a diffraction optical element, an optical system and an optical device that show a high environmental durability.

According to the invention, the above object is achieved by providing an diffraction optical element comprising:

a substrate;

a diffraction grating formed on said substrate and made of a material with low ultraviolet resistance; and an ultraviolet screening means arranged on said substrate at a position closer to the incident light receiving side of the optical element relative to said diffraction grating.

In another aspect of the invention, there is provided an optical system comprising:

a first optical element including a substrate and a diffraction grating formed on said substrate and made of a material with low ultraviolet resistance; and a second optical element arranged at a position closer to the incident light receiving side of the system relative to said first optical element and having an ultraviolet screening effect.

In still another aspect of the invention, there is provided an optical device adapted to form an image by means of an optical system according to the invention.

DESCRIPTION OF THE PREFERRED EMBODIMENTS

Now, the present invention will be described by referring to the accompanying drawings that illustrate preferred embodiments of the invention.

Figure 1:
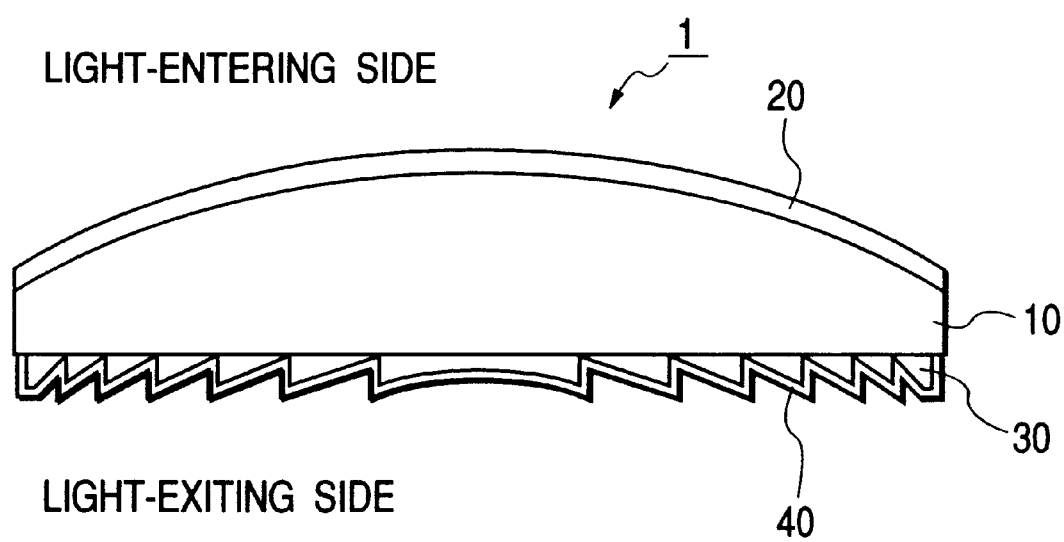
FIG. 1 is a schematic cross sectional view of an embodiment of diffraction optical element according to the invention.

FIG. 1 is a schematic cross sectional view of an embodiment of diffraction optical element according to the invention, which can advantageously be used for a camera lens. Referring to FIG. 1, the diffraction optical element 1 comprises a glass substrate 10 that operates as plano-convex lens. A replica diffraction grating 30 that is made of a material with low ultraviolet resistance such as ultraviolet curing resin is formed on the light-exiting side of the glass substrate 10. An ultraviolet (UV) cut filter 20 is formed as ultraviolet screening means on the light-entering side of the glass substrate 10. The quantity of ultraviolet rays that enter the replica diffraction grating 30 is reduced by the UV cut filter 20 to prevent the degradation of the optical performance of the replica diffraction grating 30.

Additionally, the replica diffraction grating 30 is coated with an anti-reflection film 40 made of a dense material, which prevents oxygen and moisture from entering the replica diffraction grating 30 to prevent the degradation of the optical performance of the replica diffraction grating 30. Thus, in this example, the environmental durability including the ultraviolet resistance of the replica diffraction grating 30 is improved by the UV cut filer 20 and the anti-reflection film 40.

The replica diffraction grating 30 is a blazed type diffraction grating comprising a kinoform and having positive refractive power for producing first-order diffracted light with a considerably high diffraction efficiency over the entire visible range. An element having such a grating can correct chromatic aberration and other aberrations when the element is used alone or the grating is combined with a convex surface arranged at the light-entering side and also when it is used in combination with some other lens. The principle of the aberration correcting function of such an element is well known and hence is not described here.

A UV cut filter 20 is formed by using a dielectric multilayer film. Table 1 below shows the breakdown of a dielectric multilayer film that can be used for forming a UV cut filter 20 as an example. The illustrated dielectric multilayer film is prepared by alternately arranging $TiO_2$ layers showing a relatively high refractive index and $SiO_2$ layers showing a relative low refractive index from the light-entering side (the air stratum side) to produce a total of nine layers and placing thereon an $MgF_2$ layer as the layer closest to the glass substrate. The above layers have the respective thicknesses as listed in Table 1.

TABLE 1

| layer | deposited substance | (unit: nm) physical film thickness |
|---|---|---|
| 1 | $TiO_2$ | 21.30 |
| 2 | $SiO_2$ | 38.91 |
| 3 | $TiO_2$ | 40.26 |
| 4 | $SiO_2$ | 48.62 |
| 5 | $TiO_2$ | 28.34 |
| 6 | $SiO_2$ | 58.63 |
| 7 | $TiO_2$ | 38.08 |
| 8 | $SiO_2$ | 35.89 |
| 9 | $TiO_2$ | 34.15 |
| 10 | $MgF_2$ | 107.59 |

Figure 2A:
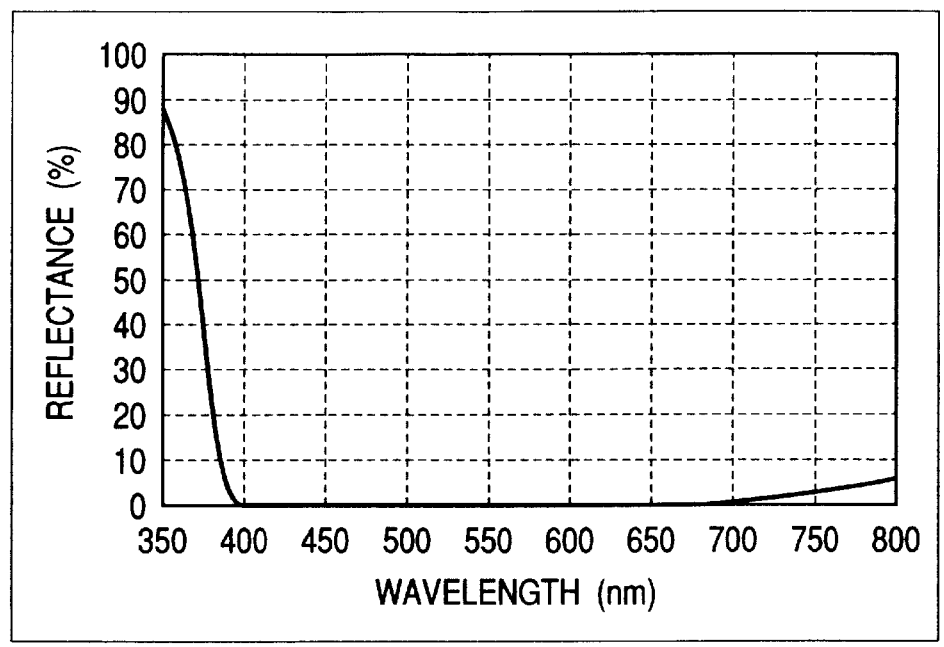
FIGS. 2A and 2B are graphs illustrating the spectral reflectance of an exemplary dielectric multilayer film that can be used for the purpose of the invention.
Figure 2B:
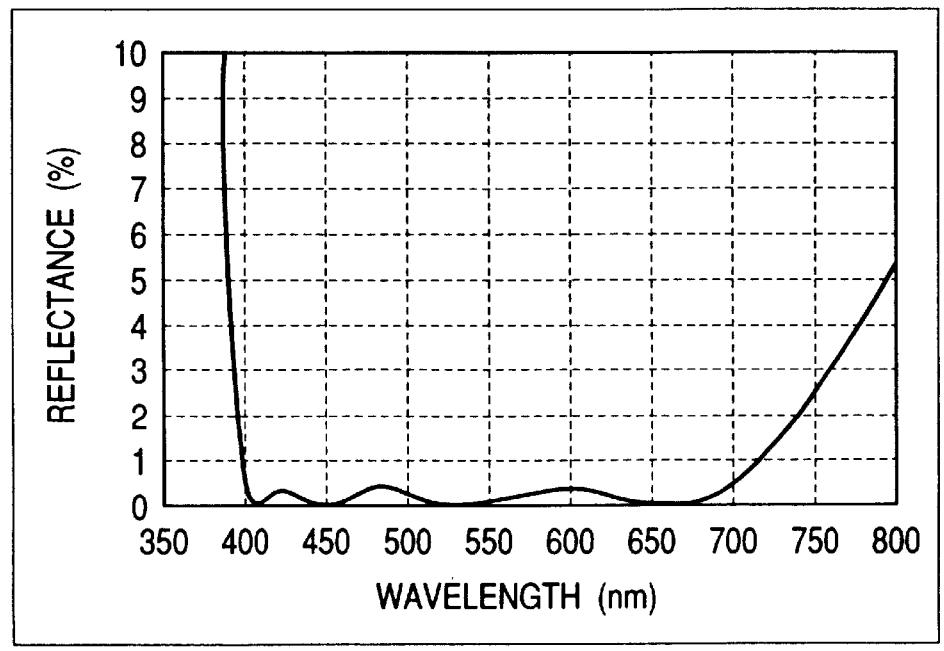

FIG. 2A is a graph illustrating the spectral reflectance of the dielectric multilayer film of Table 1. In FIG. 2A, the horizontal axis represents the wavelength (nm) and the vertical axis represents the reflectance (%). FIG. 2B is a graph obtained by scaling down the vertical axis of the graph of FIG. 2A. As seen from the graphs, the dielectric multilayer film can operate both as UV cut filter and as anti-reflection film against visible light. The configuration of such a dielectric multilayer film has to be determined according to the UV resistance of the replica diffraction grating 30. The dielectric multilayer film of Table 1 is so configured that it is relatively less effective for cutting ultraviolet rays and hence is used when the replica diffraction grating shows a considerable degree of resistance against ultraviolet rays.

Table 2 below shows the breakdown of a dielectric multilayer film that can be used for cutting more effectively ultraviolet rays. The illustrated dielectric multilayer film is prepared by alternately arranging $TiO_2$ layers showing a relatively high refractive index and $SiO_2$ layers showing a relatively low refractive index from the light-entering side (the air stratum side) to produce a total of thirteen layers and placing thereon an $MgF_2$ layer as the layer closest to the glass substrate. The above layers have the respective thicknesses as listed in Table 2.

TABLE 2

| layer | deposited substance | (unit: nm) physical film thickness |
|---|---|---|
| 1 | $TiO_2$ | 20.89 |
| 2 | $SiO_2$ | 43.09 |
| 3 | $TiO_2$ | 38.38 |
| 4 | $SiO_2$ | 50.54 |
| 5 | $TiO_2$ | 31.39 |
| 6 | $SiO_2$ | 56.71 |
| 7 | $TiO_2$ | 38.34 |
| 8 | $SiO_2$ | 46.41 |
| 9 | $TiO_2$ | 35.33 |
| 10 | $SiO_2$ | 60.94 |
| 11 | $TiO_2$ | 30.21 |
| 12 | $SiO_2$ | 55.25 |
| 13 | $TiO_2$ | 26.60 |
| 14 | $MgF_2$ | 118.01 |

Figure 3A:
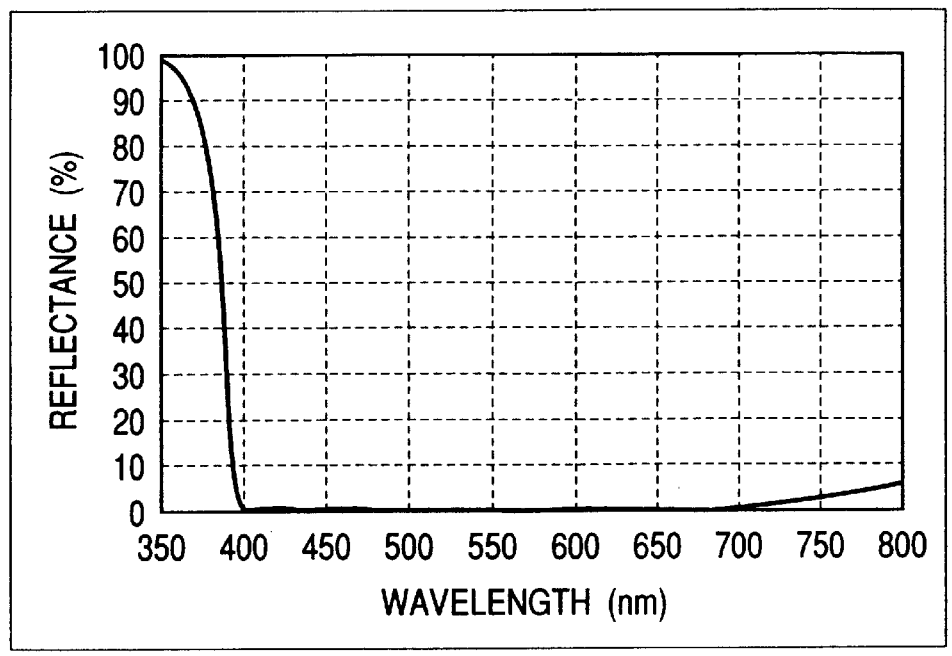
FIGS. 3A and 3B are graphs illustrating the spectral reflectance of another exemplary dielectric multilayer film that can be used for the purpose of the invention.
Figure 3B:
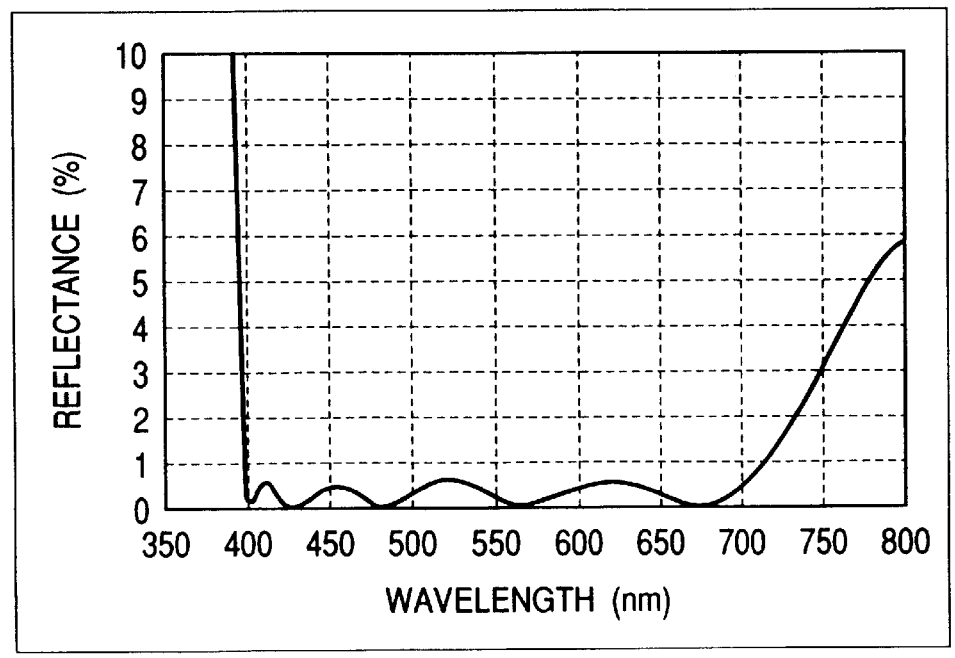

FIG. 3A is a graph illustrating the spectral reflectance of the dielectric multilayer film of Table 2. In FIG. 3A, the horizontal axis represents the wavelength (nm) and the vertical axis represents the reflectance (%). FIG. 3B is a graph obtained by scaling down the vertical axis of the graph of FIG. 3A. As seen from the graphs, the dielectric multi-layer film shows a higher reflectance relative to ultraviolet rays and hence can reduce the quantity of ultraviolet rays entering the replica diffraction grating 30 if compared with the dielectric multilayer layer of Table 1.

Table 3 below shows the breakdown of a dielectric multilayer film required to show a characteristic spectral reflectance to rays with wavelengths of visible light. The illustrated dielectric multilayer film is prepared by arranging a $ZrO_2$ layer and then alternately $SiO_2$ layers showing a relatively low refractive index and $TiO_2$ layers showing a relatively high refractive index from the light-entering side (the air stratum side) to produce a total of seven layers and placing thereon sequentially a $ZrO_2$ layer, an $Al_2O_3$ layer and an $MgF_2$ layer. The above layers have the respective thicknesses as listed in Table 3.

TABLE 3

| layer | deposited substance | (unit: nm) physical film thickness |
|---|---|---|
| 1 | $ZrO_2$ | 21.42 |
| 2 | $SiO_2$ | 44.52 |
| 3 | $TiO_2$ | 38.38 |
| 4 | $SiO_2$ | 42.06 |
| 5 | $TiO_2$ | 35.28 |
| 6 | $SiO_2$ | 60.53 |
| 7 | $TiO_2$ | 30.76 |
| 8 | $SiO_2$ | 44.58 |
| 9 | $ZrO_2$ | 41.15 |
| 10 | $Al_2O_3$ | 7.95 |
| 11 | $MgF_2$ | 104.27 |

Figure 4:
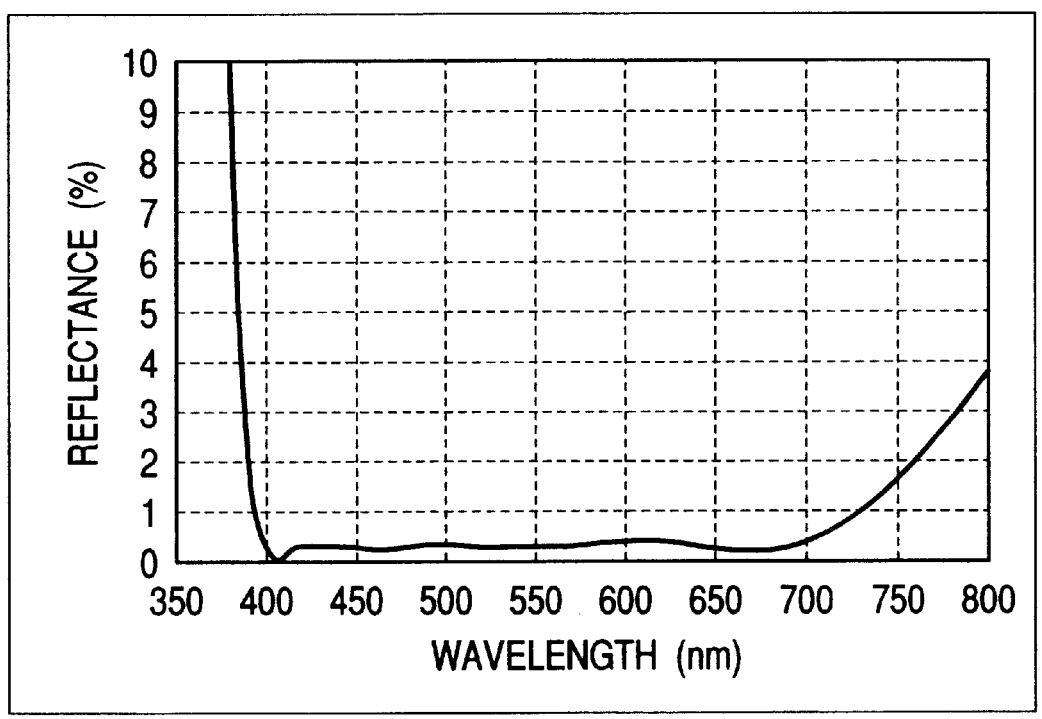
FIG. 4 is a graph illustrating the spectral reflectance of still another exemplary dielectric multilayer film that can be used for the purpose of the invention.

FIG. 4 is a graph illustrating the spectral reflectance of the dielectric multilayer film of Table 3. In FIG. 4, the horizontal axis represents the wavelength (nm) and the vertical axis represents the reflectance (%). As seen from the graph, the dielectric multilayer film shows fewer ripples as compared with the films of Tables 1 and 2 in the reflectance relative to rays with wavelengths of visible light and hence can more suitably be used as anti-reflection film.

Now, a method of manufacturing the above described embodiments of diffraction optical element according to the invention will be described below.

Firstly, a UV cut filter 20 is formed on the surface of the light-entering side of a glass substrate 10 by means of a film forming technique such as vacuum evaporation, ion beam assisted deposition or sputtering and then a replica diffraction grating 30 is formed on the other surface (of the light-exiting side) of the glass substrate 10 by means of a replica forming diffraction grating mold (not shown) prepared to show a predetermined profile in an ultraviolet curing replica forming process. Subsequently, an anti-reflection film 40 is formed on the surface of the diffraction grating by vacuum evaporation. Since the replica diffraction grating 30 is made of a resin material, the above film forming process is conducted by using a cold film forming method that keeps the substrate heating temperature as low as possible unlike any ordinary film forming method of using a substrate heated to a relatively high temperature level.

In an experiment, the prepared diffraction optical element was subjected to an environmental durability test. As a result, it was found that the optical performance of the diffraction optical element was not practically degraded at all after an environmental durability test, which was a harsh weather resistance test (using irradiation of UV rays and a thermohygrostat test in combination), due to the combined effect of the UV cut filter 20 arranged at the light-entering side of the glass substrate 10 and operating as means for blocking ultraviolet rays and the anti-reflection film 40 formed on the surface of the replica diffraction grating 30.

Figure 5:
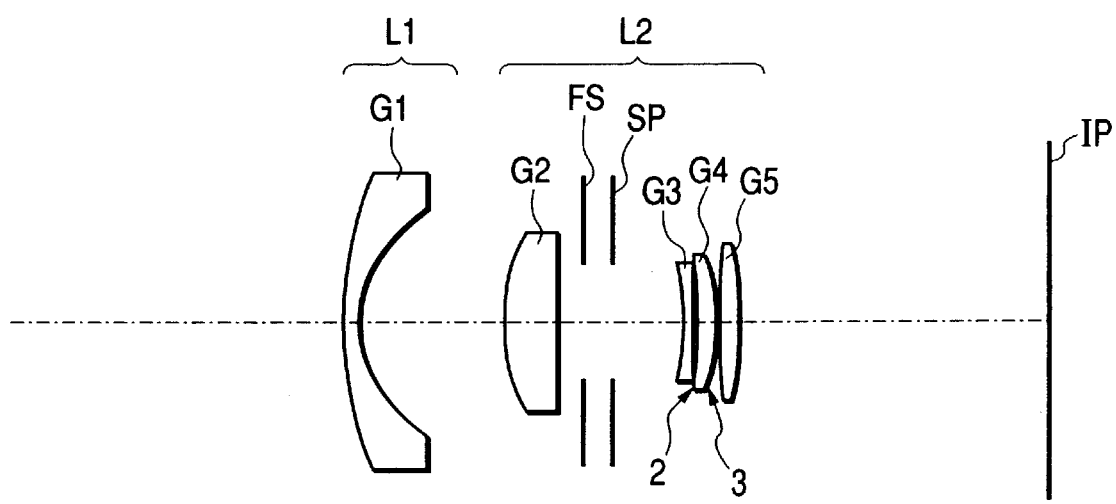
FIG. 5 is a schematic cross sectional view of a first embodiment of optical system according to the invention.

FIG. 5 is a schematic cross sectional view of a first embodiment of optical system according to the invention and comprising a diffraction optical element as shown in FIG. 1. The diffraction optical element of this embodiment is adapted to be used for a zoom lens of a camera.

The zoom lens of FIG. 5 comprises a first lens group L1 having negative refractive power and a second lens group L2 having positive refractive power arranged in this order from the side of the object to be shot. In FIG. 5, reference symbol FS denotes a flare cutter and SP and IP respectively denote a stop and an imaging plane. The operation of focussing a near object from an infinitely remote object is carried out by moving both the first lens group L1 and the second lens group L2 together toward the object. The first lens group L1 comprises a meniscus-shaped negative lens G1 having its convex surface facing the object, while the second lens group L2 comprises a positive lens G2 having two convex surfaces, a negative lens G3 having two concave surfaces and a pair of positive lenses G4 and G5.

A diffraction optical element 1 as shown in FIG. 1 is used for the positive lens G4. More specifically, a diffraction grating of ultraviolet curing resin is formed on the lens surface 3 of the image side (light-exiting side) of the positive lens G4. The diffraction grating is covered by an anti-reflection film. On the other hand, a UV cut filter is arranged on the lens surface 2 of the object side (light-entering side) of the positive lens G4. The UV cut filter may have a multilayer structure as described above by referring to Tables 1 through 3.

Figure 6:
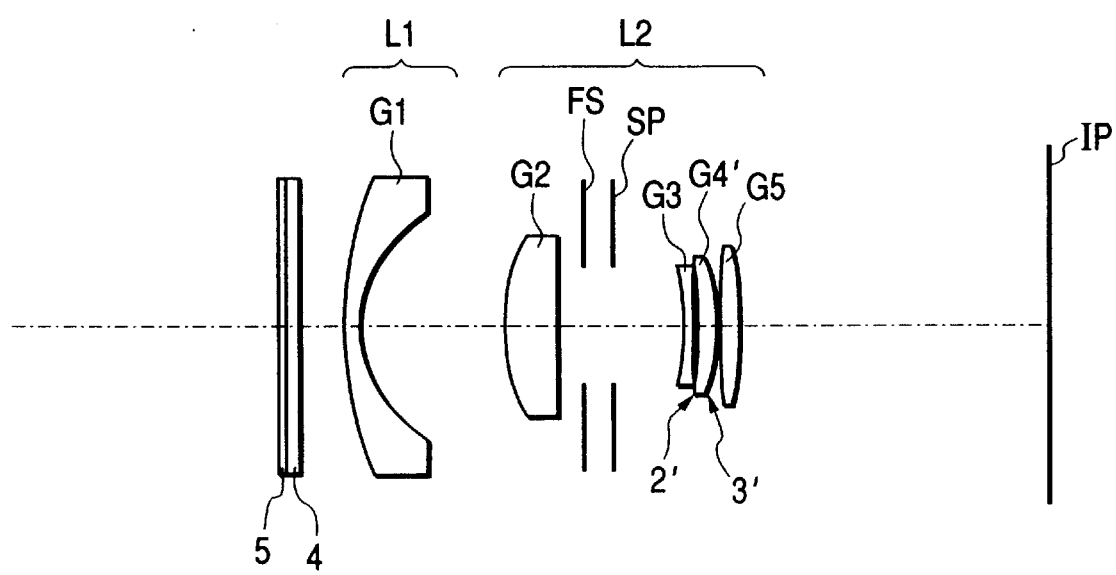
FIG. 6 is a schematic cross sectional view of a second embodiment of optical system according to the invention.

FIG. 6 is a schematic cross sectional view of a second embodiment of optical system according to the invention and comprising a diffraction optical element. The diffraction optical element of this embodiment is also adapted to be used for a zoom lens of a camera, which zoom lens may have a configuration substantially same as the one described above by referring to the first embodiment but differs therefrom in that the positive lens G4 is replaced by another positive lens G4' and the UV cut filter is arranged closer to the object side (light-entering side) of the camera than the negative lens G1.

As in the case of the first embodiment, a diffraction grating of ultraviolet curing resin is arranged on the lens surface 3' of the image side (light-exiting side) of the positive lens G4'. The diffraction grating is covered by an anti-reflection film. However, unlike the first embodiment, no UV cut filter is arranged on the lens surface 2' of the object side (light-entering side) of the positive lens G4'. In this embodiment, a UV cut filter is arranged at a position closer to the light-entering side of the zoom lens than the positive lens G4' as a separate member instead of placing a UV cut filter on the surface 2' of the light-entering side of the positive lens G4'. The UV cut filter of this embodiment comprises a substrate 4 that is a flat plate having a pair of parallel surfaces and arranged at a position closer to the light-entering side of the zoom lens than the negative lens G1 and a dielectric multilayer film 5 formed on the substrate 4. The dielectric multilayer film 5 may have a structure as described above by referring to Tables 1 through 3.

Figure 7:
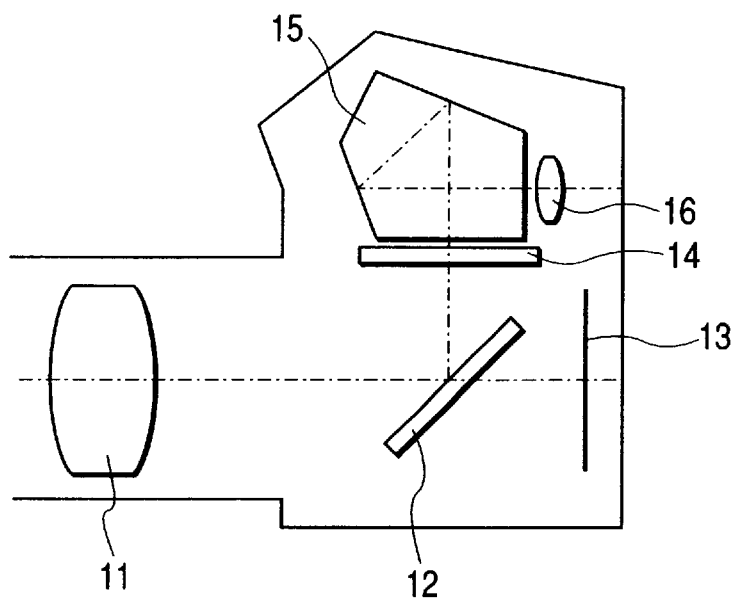
FIG. 7 is a schematic cross sectional view of a first embodiment of optical device according to the invention, which is a single-lens reflex camera.

FIG. 7 is a schematic cross sectional view of a first embodiment of optical device according to the invention as applied to a single-lens reflex camera as an imaging device.

Referring to FIG. 7, illustrating the optical system of a camera, a main mirror 12 and a film surface 13 are arranged behind an imaging lens 11 and a focussing plate 14 and a pentaprism 15 are arranged on the course of light reflected by the main mirror 12. Then, an eyepiece 16 is arranged on the course of light reflected by the pentaprism 15. A lens as shown in FIG. 5 or 6 may be used for the imaging lens 11.

Figure 8:
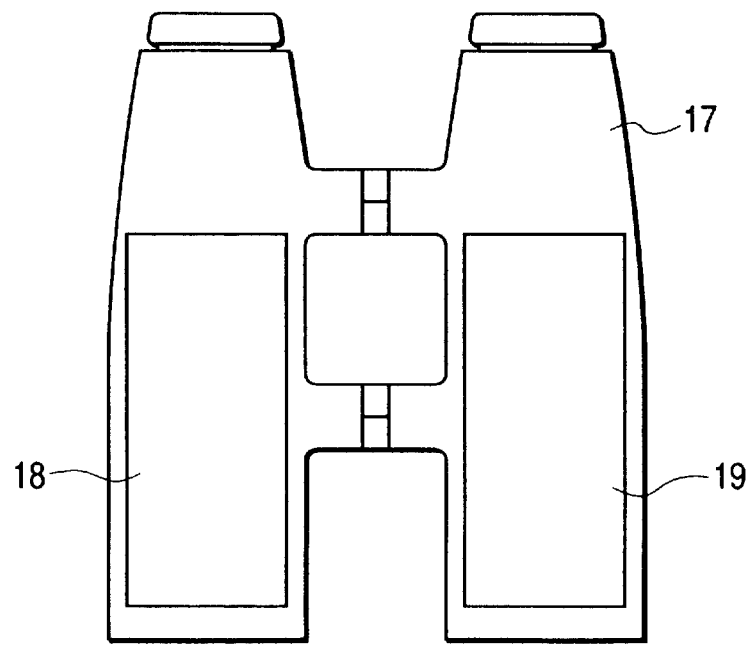
FIG. 8 is a schematic cross sectional view of a second embodiment of optical device according to the invention, which is a binocular.

FIG. 8 is a schematic cross sectional view of a second embodiment of optical device according to the invention as applied to a binocular as an observation device.

The binocular of FIG. 8 comprises a pair of lenses 18 and 19 fitted to a body 17. A lens as shown in FIG. 5 or 6 may be used for each of the lenses 18 and 19. In other words, each of the lenses of the binocular of this embodiment is provided with a diffraction grating as part thereof and an ultraviolet screening means such as a UV cut filter is arranged closer to the light-entering side of the lens than the diffraction grating.

In each of the above described embodiments, a UV cut filter is arranged at the light-entering side of the diffraction grating of a diffraction optical element when the diffraction grating is made of a material poorly resistant against ultraviolet rays. It may be appreciated that the same technological concept can be applied to occasions where a wavelength range other than that of ultraviolet rays gives rise to problems.

The present invention is applicable not only to single-lens reflex cameras and binoculars but also to video cameras and other imaging devices as well as to microscopes and other observation devices.

As described above, according to the invention, there are provided a diffraction grating element having an excellent environmental durability and also an optical system and an optical device having an excellent environmental durability. Therefore, such a diffraction grating, an optical system and an optical device are practically free from degradation of performance.

What is claimed is:

1. A diffraction optical element comprising:

a glass lens;

an ultraviolet screening means provided on a light-entering side of said glass lens; and a diffraction grating provided on the other side of said glass lens.

2. A diffraction optical element according to claim 1, wherein said diffraction grating is made of ultraviolet curing resin.

3. A diffraction optical element according to claim 1, wherein said ultraviolet screening means comprises a dielectric multilayer film adapted to reflect ultraviolet rays.

4. A diffraction optical element according to claim 3, wherein said dielectric multilayer film has a function of preventing reflection of visible light.

5. A diffraction optical element according to claim 3, wherein said dielectric multilayer film comprises not less than two different materials including one or more than one layers comprising a fluoride and one or more than one layers comprising an oxide.

6. A diffraction optical element according to claim 1, wherein said diffraction grating is covered by an anti-reflection film.

7. An optical system comprising a plurality of optical elements including a diffraction optical element according to claim 1.

8. An optical device for forming an image by using an optical system according to claim 7.

9. An optical device according to claim 8, wherein said optical device comprises an imaging device.

10. An optical device according to claim 8, wherein said optical device comprises an observation device.

11. An optical system comprising:
   a first optical element including a substrate and a diffraction grating formed on said substrate and made of a material with low ultraviolet resistance; and
   a second optical element arranged at a position closer to the incident light receiving side of the system relative to said first optical element, said second optical element including a substrate and a dielectric multilayer film arranged on said substrate and adapted to reflect ultraviolet rays.

12. An optical system according to claim 11, wherein the diffraction grating of said first optical element is made of ultraviolet curing resin.

13. An optical system according to claim 11, wherein said dielectric multilayer film comprises not less than two different materials including one or more than one layer comprising a fluoride and one or more than one layer comprising an oxide.

14. An optical device adapted to form an image by means of an optical system according to claim 11.

15. An optical system according to claim 14, wherein said optical device comprises an imaging device.

16. An optical device according to claim 14, wherein said optical device comprises an observation device.

* * * * *

UNITED STATES PATENT AND TRADEMARK OFFICE
CERTIFICATE OF CORRECTION

PATENT NO.     : 6,522,464 B2
DATED          : February 18, 2003
INVENTOR(S)    : Tetsuo Kuwabara et al.

It is certified that error appears in the above-identified patent and that said Letters Patent is hereby corrected as shown below:

Column 1,
Line 39, "an" should read -- a --; and
Line 62, "cross sectional" should read -- cross-sectional --.

Column 2,
Lines 7, 9, 11, 14 and 23, "cross sectional" should read -- cross-sectional --; and
Line 65, "relative" should read -- relatively --.

Column 4,
Line 40, "above described" should read -- above-described --.

Column 5,
Lines 5, 33 and 63, "cross sectional" should read -- cross-sectional --.

Column 6,
Line 6, "cross sectional" should read -- cross-sectional --; and
Line 16, "above described" should read -- above-described --.

Column 8,
Line 11, "system" should read -- device --.

Signed and Sealed this

Fourth Day of November, 2003

JAMES E. ROGAN
*Director of the United States Patent and Trademark Office*